United States Patent [19]

Hass

[11] 4,222,991
[45] Sep. 16, 1980

[54] PROCESS FOR REMOVING $SO_x$ AND $NO_x$ COMPOUNDS FROM GAS STREAMS

[75] Inventor: Robert H. Hass, Fullerton, Calif.

[73] Assignee: Union Oil Company of California, Los Angeles, Calif.

[21] Appl. No.: 907,189

[22] Filed: May 18, 1978

[51] Int. Cl.$^2$ ............................................. B01D 53/34
[52] U.S. Cl. .................................. 423/235; 423/245; 423/243; 423/567 A; 423/569; 252/184; 252/188.3 R; 252/191; 210/683
[58] Field of Search .............. 423/242, 243, 235, 567, 423/567 A, 569; 252/184, 191, 188.3 R; 210/24, 37 R

[56] References Cited

U.S. PATENT DOCUMENTS

| | | | |
|---|---|---|---|
| 2,142,987 | 1/1939 | Bacon | 423/243 |
| 2,664,441 | 12/1953 | Owens et al. | 210/37 R |
| 2,697,725 | 12/1954 | Bryce | 210/37 R |
| 2,729,543 | 1/1956 | Keller | 423/243 |
| 3,397,963 | 8/1968 | Wagner | 423/569 |
| 3,584,042 | 6/1971 | Yavorsky et al. | 260/542 |
| 3,592,850 | 7/1971 | Mazzocco et al. | 260/542 |
| 3,687,614 | 8/1972 | Yavorsky et al. | 423/243 |
| 3,687,615 | 8/1972 | Gorin et al. | 423/243 |
| 3,928,537 | 12/1975 | Saitoh et al. | 423/243 |
| 3,961,034 | 6/1976 | Bostian et al. | 210/37 R |
| 3,984,522 | 10/1976 | Saitoh et al. | 423/235 |
| 4,013,430 | 3/1977 | Adachi et al. | 423/235 |
| 4,055,623 | 10/1977 | Saitoh et al. | 423/235 |
| 4,071,602 | 1/1978 | Pearce | 423/235 |
| 4,083,944 | 4/1978 | Chalmers | 423/567 A |

OTHER PUBLICATIONS

Wagner, "Reactions with Addition Compounds Containing Activated Formic Acid," Angew. Chem. International Edition, vol. 9, (1970), No. 1, pp. 50–54.
"$NO_x$ Abatement for Stationary Sources in Japan," Published by the Environmental Protection Agency, Sep. 1977, pp. 135–142.
Yavorsky et al., "Potassium Formate Process for Removing $SO_2$ from Stack Gas," Environmental Science & Technology, vol. 4, No. 9, Sep. 1970, pp. 757–765.
"Amber-Hi-Lites," Special Issue, Jan. 1941, Rohm & Haas Co., Philadephia, Pa., 7 pages.

Primary Examiner—Earl C. Thomas
Attorney, Agent, or Firm—Gregory F. Wirzbicki; Dean Sandford

[57] ABSTRACT

A process for removing $SO_x$ pollutants from a stack gas by (1) absorbing the $SO_x$ pollutants with an aqueous absorbent containing a formate compound and (2) regenerating the spent absorbent containing dissolved $SO_x$ compounds by contact, in the presence of added formate anion, with a water-insoluble, solid substance containing one or more tertiary amine functional groups. Nitrogen monoxide is removed by providing an aqueous absorbent of an iron(II) chelate, such as a chelate of ferrous ion with ethylenediaminetetraacetic acid. Regeneration of spent absorbent containing absorbed NO is accomplished under the same conditions as for spent absorbents containing absorbed $SO_x$ compounds. $SO_x$ and NO pollutants dissolved in the absorbent are, during regeneration, converted to sulfur and nitrogen without the discharge of waste solids.

34 Claims, 1 Drawing Figure

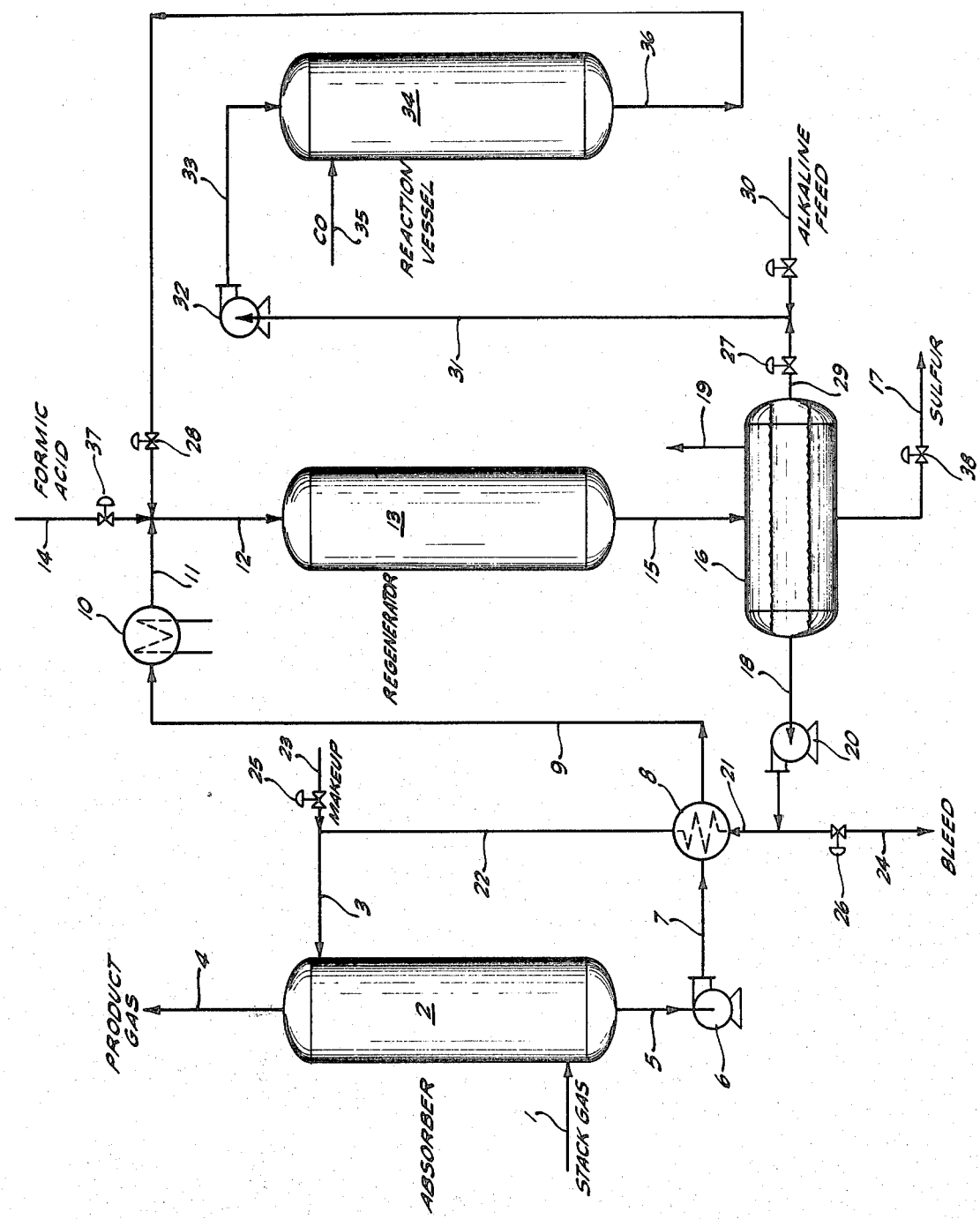

PROCESS FOR REMOVING $SO_x$ AND $NO_x$ COMPOUNDS FROM GAS STREAMS

BACKGROUND OF THE INVENTION

This invention relates to the removal of $SO_x$ and $NO_x$ compounds from waste gas streams. More particularly, the invention relates to the removal of $SO_2$, $SO_3$, NO, and $NO_2$ from industrial stack gases.

The burning of coal or oil as fuel in a boiler or furnace produces a flue gas (or stack gas) usually containing $SO_2$ and $SO_3$. The concentration of these sulfur compounds in a particular stack gas depends upon such factors as the concentration of sulfur components in the fuel, the metals concentration in the fuel, and the air rate fed to the boiler or furnace. A stack gas, however, will usually contain between about 100 ppmv and 5 mole percent $SO_x$ compounds, with the large majority thereof, usually at least about 95% thereof, being in the form of $SO_2$.

Before a stack gas containing $SO_x$ compounds may be discharged to the atmosphere, many environmental regulatory agencies require that the stack gas be desulfurized, that is, that the concentration of sulfur compounds therein be reduced to specified levels. In California, for example, gases containing more than 500 ppmv of total sulfur compounds (calculated as $SO_2$) may not be discharged to the atmosphere. Hence, stack gases containing more than 500 ppmv sulfur compounds must be desulfurized prior to discharge to the atmosphere.

Two of the most conventional methods presently being utilized to remove $SO_x$ compounds from stack gases involve contacting the stack gas with lime or caustic. Such processes, however, while favorable from a cost standpoint, produce a relatively large amount of calcium sulfate, sodium sulfate or other undesirable by-products that represent a difficult waste disposal problem. Accordingly, it is an object of this invention to provide a process for desulfurizing stack gases while at the same time reducing or eliminating the problem of solid waste disposal. It is another object of this invention to provide a process wherein sulfur compounds removed from the stack gas are dissolved in an aqueous absorbent medium, which aqueous absorbent medium is subsequently regenerated by reducing the dissolved sulfur components to elemental sulfur under mild conditions of temperature and pressure. In addition, because many stack gases contain $NO_x$ compounds as well as $SO_x$ compounds, said $NO_x$ compounds being formed during combustion at least in part by the reaction of nitrogen and oxygen in the air supporting combustion, it is a further object of the invention to provide an aqueous adsorbent medium for removing both $SO_x$ and $NO_x$ pollutants, which absorbent is capable of being regenerated in a single regeneration vessel to a form active for removing $SO_x$ and $NO_x$ compounds.

SUMMARY OF THE INVENTION

According to this invention, $SO_x$ compounds present in stack gases and other feed gases are removed therefrom by contact with an absorbent comprising an aqueous solution of one or more formate compounds. The process is most successfully accomplished in a contacting zone into which the feed gas and fresh (or regenerated) absorbent is introduced and from which a desulfurized product gas and spent absorbent are continuously removed.

Provision is also made in the invention for regenerating the spent absorbent to a form once again active for removing $SO_x$ compounds. This is accomplished by contacting the spent absorbent, in the presence of added formate ion, and under conditions of mild temperature and pressure, with a water-insoluble, solid substance containing a tertiary amine functional group. Such contacting results in the regeneration of the absorbent by converting a substantial proportion of the dissolved sulfur constituents to elemental sulfur, which elemental sulfur is removed from the regenerated, aqueous absorbent by separation in a suitable separator, such as a liquid-liquid separator operating at 260° F. The sulfur is collected as a marketable by-product, and the regenerated absorbent is used as make-up for the absorbent being used to remove the $SO_x$ compounds from the stack gas.

In one alternative embodiment of the invention, the added formate ion required during regeneration is provided by subjecting a slip stream of regenerated absorbent to conditions of elevated temperature and pressure in the presence of carbon monoxide and an alkaline medium such that a solution containing formate ion is produced. In this embodiment, a dilute stream of a dissolved formate compound is produced, usually at a rate sufficient to provide all of the formate ion required in the regeneration step.

In another embodiment of the invention, a water-soluble iron(II) chelate is introduced into the absorbent for the purpose of absorbing NO which might also be present along with the $SO_x$ compounds in the feed gas stream. In such embodiment, regeneration of the spent absorbent in the manner hereinbefore described results in the absorbent becoming active for the absorption of both $SO_x$ and NO compounds.

As used herein, the term absorbent refers to the aqueous medium used in the process to remove $SO_x$ and/or $NO_x$ from the feed gas, regardless of the particular mechanism by which the $SO_x$ and $NO_x$ components are removed from the feed gas and retained by the absorbent. Also, reference to $SO_x$ is meant to include $SO_2$ and $SO_3$ while reference to $NO_x$ is meant to include NO and $NO_2$.

BRIEF DESCRIPTION OF THE DRAWING

The drawing is a schematic flowsheet of the preferred embodiment of the invention for removing $SO_x$ and $NO_x$ pollutants from a feed gas. For simplicity, devices such as pressure relief valves, back pressure regulators, and other conventional equipment have not been represented in the drawing.

DETAILED DESCRIPTION OF THE INVENTION

The gas streams suitable for treatment in the process of this invention are those gas streams containing $SO_x$ and/or $NO_x$ compounds. Preferred gas streams for treatment herein contain at least some $SO_x$ compounds, most preferably in concentrations exceeding 500 ppmv. Such gas streams include waste gas streams, such as a Claus tail gas stream that has been subjected to oxidation so as to contain $SO_2$ as the major sulfur component. The preferred waste gas stream, however, is particulate-free stack gas containing $SO_2$ and $SO_3$ as essentially the only sulfur compounds therein. A typical stack gas contains the several gaseous components listed in Table I in the range of concentrations shown.

TABLE I

| Component | Mol % | Component | ppmv |
|---|---|---|---|
| $O_2$ | 1–5 | CO | 0–500 |
| $CO_2$ | 10–20 | $NO_x$ | 0–2000 |
| $H_2O$ | 5–25 | $SO_2$ | 0–50,000 |
| $N_2$ | 70–75 | $SO_3$ | 0–200 |

As broadly conceived, this invention is designed to remove $SO_x$ and $NO_x$ compounds from a stack gas or other gas stream containing $SO_x$ and/or $NO_x$ components without also creating a solids waste disposal problem. These twofold objectives are accomplished by first providing an aqueous absorbent capable of removing whichever $SO_x$ and $NO_x$ pollutants are present in the stack gas. Following absorption, the spent absorbent is directed to regeneration facilities wherein not only is the absorbent regenerated to its active form for removing $NO_x$ and $SO_x$, but also the absorbed $SO_x$ and $NO_x$ components are converted to marketable elemental sulfur and the innocuous gases of nitrogen and carbon dioxide by reaction with a cheap reducing agent, carbon monoxide, according to the following overall chemical reaction:

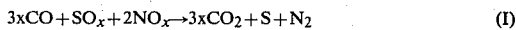

$$3xCO + SO_x + 2NO_x \rightarrow 3xCO_2 + S + N_2 \quad (I)$$

As will be shown, the invention provides for introducing the carbon monoxide required in Reaction (I) directly into the process or indirectly in combined form as a formate compound. The method by which the invention accomplishes these objectives will now be described in more detail, with attention first being directed to removing $SO_x$ and then with respect to removing $NO_x$.

$SO_x$ REMOVAL

Referring now to the drawing, the preferred embodiment of the invention will be described with relation to removing $SO_x$ components from a particulate-free stack gas containing $SO_2$ and $SO_3$ in concentrations falling in the typical ranges listed in Table I. The stack gas is fed by line 1 at a convenient temperature, usually less than about 200° F., and at a rate between about 1000 SCF/hr and about 100,000 SCF/hr and at a pressure above atmospheric but preferably less than about 15 psig into absorber 2. The absorber may comprise such suitable gas-liquid absorption equipment as a packed tower, a multi-plate column, or a venturi scrubber, but the design should be such that sufficient contact time is provided for the $SO_x$ components to react as fully as possible with the fresh absorbent introduced through line 3 and make-up line 23. Preferably, the absorber is of a packed tower design, and the stack gas is passed countercurrently to the flow of the absorbent. An essentially $SO_x$-free and desulfurized product gas is thus discharged to the atmosphere by line 4 while spent absorbent containing dissolved $SO_x$ compounds is withdrawn via conduit 5.

The fresh absorbent fed into absorber 2 via lines 3 and 23 is an aqueous solution containing one or more water-soluble formate compounds, such as sodium formate, lithium formate, potassium formate, ammonium formate, or formic acid. The preferred aqueous absorbent comprises sodium formate, especially when buffered with formic acid to a pH in the 2.5–5.0 range.

Optionally, but not preferably, the fresh absorbent fed into the system via line 23 contains an alkaline agent in addition to the formate compound or compounds. The alkaline agent, if used, is preferably sodium hydroxide, but ammonium hydroxide or any water-soluble metal hydroxide, especially the alkali metal hydroxides, may be used, as also may such components as sodium carbonate, sodium bicarbonate, and other water-soluble salts of a strong base and a weak acid. For treating a typical stack gas of composition shown in Table I, the fresh absorbent added via line 3 typically contains 5–30 wt.% of sodium formate, 0–20 wt.% of additional alkaline agent, and sufficient formic acid to maintain the pH of the absorbent entering the absorber between about 2.5 and 10.0, and more preferably between 2.5 and 5.0. A preferred composition comprises 5 to 10 wt.% sodium formate and sufficient formic acid to maintain the pH of the fresh absorbent in line 3 in the 4.5–5.0 range. A still more preferred absorbent composition comprises 6.8 wt.% sodium formate and sufficient formic acid to buffer the composition at a pH of 4.6.

Although the invention is not intended to be limited to any particular theory of operation, it is believed that the chemical reactions in the absorber between the gaseous components in stack gas of composition shown in Table I and the components of the preferred aqueous absorbent containing no alkaline agent and having an acidic pH include the following:

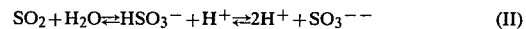

$$SO_2 + H_2O \rightleftharpoons HSO_3^- + H^+ \rightleftharpoons 2H^+ + SO_3^{--} \quad (II)$$

$$SO_3 + H_2O \rightarrow HSO_4^- + H^+ \quad (III)$$

$$2HSO_3^- + O_2 \rightarrow 2HSO_4^- \quad (IV)$$

$$HSO_4^- \rightleftharpoons H^+ + SO_4^{--} \quad (V)$$

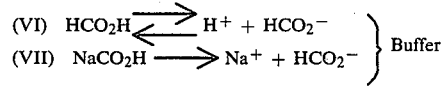

$$\text{(VI)} \quad HCO_2H \rightleftharpoons H^+ + HCO_2^-$$
$$\text{(VII)} \quad NaCO_2H \rightarrow Na^+ + HCO_2^- \quad \Big\} \text{Buffer}$$

When the absorber is operating under preferred conditions, the flow rate of the absorbent fed via line 3 is so correlated with the amount of $SO_x$ removed from the stack gas that spent absorbent is withdrawn from absorber 2 via conduit 5 at a pH less than 7.0, thereby avoiding withdrawal of a solution rich in dissolved $CO_2$ from the stack gas. When the preferred absorbent containing no additional alkaline agent is utilized, the pH of the spent absorbent is withdrawn at a buffered pH between about 3.0 and 4.5, and more preferably still, between 3.8 and 4.2, with 4.0 being most highly preferred.

The spent absorbent in line 5 must be regenerated before being recycled to absorber 2 through line 3. However, in order to regenerate the spent absorbent in accordance with the invention, it must first be heated to a temperature of at least 150° F., usually between about 200° and 350° F., and preferably between 240° and 350° F., and most preferably to a temperature of 260° F. Thus, the absorbent in line 5 is directed by pump 6 through pipe 7 to heat exchanger 8 wherein by indirect heat exchange with heated, regenerated absorbent the temperature of the spent absorbent is raised to about 150°–200° F. The absorbent is then introduced by conduit 9 into a second preheater 10, wherefrom heated absorbent is obtained in line 11 at the preferred temperature of 260° F. Subsequently, an aqueous solution containing a dissolved formate compound such as dissolved formic acid is blended through line 14, and the resulting mixture in pipe 12 is conducted into regenerator 13.

In regenerator 13, the spent absorbent solution, now containing added formate ion from the formic acid, is regenerated back to its active form by contact at a pressure in the range of 4–135 psia and at a temperature of 150°–350° F. with a water-insoluble, solid substance containing one or more tertiary amine (a valence state 3 nitrogen atom bonded only to carbon atoms) functional groups, with said functional group preferably having anion exchange capacity and being ion exchanged to contain formate ion in at least some of the ion exchange sites. Preferably, a water-insoluble, anionic, organic, ion exchange resin containing tertiary amine functional groups, such as that marketed by Rohm & Haas Company under the trade name of Amberlyst A-21 is utilized. Although the exact composition of this resin is not available to the public, it is known that Amberlyst A-21 is a water-insoluble organic resin of macroreticular structure comprising a copolymer of styrene and divinylbenzene and containing weakly basic, tertiary amine functional groups. It is further known that Amberlyst A-21 is stable in regenerator 13 at the preferred operating temperature of 260° F., and that, when treated to contain the formate ion at the ion exchange sites, it has catalytic activity for regenerating the spent absorbent solution to a form active for absorbing $SO_x$ compounds. Hence, when initially charged to regenerator 13, the Amberlyst A-21 resin particles are preferably ion-exchanged to contain the formate ion by pretreatment with hot formic acid. In non-preferred embodiments, however, the resin may be pretreated by ion-exchange with a salt of formic acid, such as sodium formate, or the resin may simply be converted to the active form in situ, e.g., by adding sufficient formic acid via line 14 to activate the resin during regeneration.

Although the invention is not limited to any particular theory of operation, it is believed that, when formic acid is the formate compound added via line 14, the chemical reactions resulting in the conversion of the absorbent solution back to its active form include the following ionic reactions:

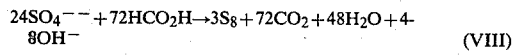

$$24SO_4^{--} + 72HCO_2H \rightarrow 3S_8 + 72CO_2 + 48H_2O + 48OH^- \quad (VIII)$$

$$8SO_3^{--} + S_8 \rightleftharpoons 8S_2O_3^{--} \quad (IX)$$

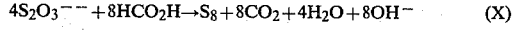

$$4S_2O_3^{--} + 8HCO_2H \rightarrow S_8 + 8CO_2 + 4H_2O + 8OH^- \quad (X)$$

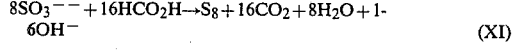

$$8SO_3^{--} + 16HCO_2H \rightarrow S_8 + 16CO_2 + 8H_2O + 16OH^- \quad (XI)$$

and the following reactions of elemental sulfur and elemental oxygen, the latter being dissolved in the absorbent solution:

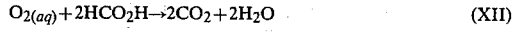

$$O_{2(aq)} + 2HCO_2H \rightarrow 2CO_2 + 2H_2O \quad (XII)$$

$$S_8 + 8HCO_2H \rightarrow 8H_2S + 8CO_2 \quad (XIII)$$

Regeneration of the spent absorbent in regenerator 13 may be conveniently accomplished in a stirred reactor vessel wherein the absorbent being regenerated and the organic resin are slurried for a time sufficient to produce a substantial amount of elemental sulfur. More preferably, however, the elemental sulfur is produced in a fixed bed reactor in which the spent absorbent must pass through a bed of Amberlyst A-21 resin (or other suitable resin) maintained to a depth of at least two feet, more preferably at least three feet, with the preferred ratio of bed depth to average bed diameter being 5:1. When a fixed bed reactor is used, the absorbent is passed through the bed of resin at a liquid hourly space velocity of at least 0.1, preferably at least 0.3, but no more than 10.0. The preferred operating conditions maintained in a fixed bed reactor are as follows: 260° F., 21 psig, 0.5 LHSV.

When preferred conditions are utilized in regenerator 13, and especially when the temperature within regenerator 13 is maintained at or slightly above the melting point of sulfur, but preferably at about 260° F., the effluent in line 15 will be a three-phase system comprising a non-condensable gas phase and a two-phase liquid comprising a first liquid phase of regenerated absorbent and a second liquid phase of elemental sulfur. This effluent is directed to sulfur separator 16, where, under appropriate conditions, such as a temperature of 260° F. and a pressure of 21 psig, sulfur is separated from the regenerated absorbent. Liquid sulfur is therefore withdrawn from the sulfur separator via pipe 17 while the regenerated absorbent is removed at a pH between about 2.5 and 10.0 by pipe conduit 18. Also removed from sulfur separator 16 are non-condensable gases produced in regenerator 13. Typically, the gas stream discharged through vent 19 contains a large proportion of $CO_2$, usually in a concentration of 90% by volume (dry basis), with the remainder of the gases comprising hydrogen sulfide, water vapor, and traces of nitrogen, ammonia, hydrogen, and carbon monoxide.

The regenerated absorbent recovered in line 18 is directed by pump 20 and conduit 21 to heat exchanger 8 and thence to absorber 2 via lines 22 and 3. Eventually, steady state conditions will be attained and the fresh absorbent feed from make-up line 23 is either shut-off or reduced as required by operating control valve 25. Line 24 and control valve 26 are provided to bleed absorbent from the system as required.

Under steady state conditions, the chemical composition of the regenerated absorbent in line 22 will contain not only the components originally added via make-up line 23, but also residual sulfur-containing anions such as sulfate, thiosulfate, sulfite, etc. The concentration of these sulfur anions will increase drammatically if preferred conditions are not maintained in regenerator 13. In particular, a regenerated absorbent containing high proportions of sulfur-containing anions, mostly as the sulfate and thiosulfate ion, will be produced in line 18 if the temperature maintained in regenerator 13 is less than about 240° F. Also, if the temperature in the regenerator is so high that the resin begins to degrade, it can be seen that the regenerated absorbent in line 18 would gradually increase in concentration of sulfur-containing anions in direct relationship to the gradual loss of catalytic activity of the resin. Thus, for best results, and especially to maintain the make-up rate of fresh absorbent in line 23 and the bleed-rate of spent absorbent in line 24 as low as possible, regenerator 13 should be operated under the conditions stated hereinbefore, and most specifically at a preferred temperature between about 240° F. and the temperature at which the particular resin chosen begins to degrade.

Under steady state conditions, it is of course necessary that the regeneration in regenerator 13 be such that at least as much elemental sulfur is produced as is absorbed by the absorbent in the form of dissolved $SO_x$ components. Since it is inconvenient to control the process based on sulfur recovery from sulfur separator 16, the process is more successfully controlled based on the pH of the spent absorbent recovered from absorber 2 and that of the regenerated absorbent recovered from separator 16. In general, the process will prove operative for removing $SO_x$ provided, under steady state conditions, the pH of the regenerated absorbent is higher than that of the spent absorbent. Depending upon the conditions utilized throughout the process, and especially on the pH of the fresh absorbent originally added to the process via line 23 and on the conversion of dissolved sulfur components (as sulfur) to sulfur in regenerator 13, which may range from as little as 10% in non-preferred embodiments to at least 75% in the preferred and at least 90% in the most preferred embodiment, the pH rise across regenerator 13 may be as little as 0.1 to as much as 5.0 pH units. In the preferred embodiment in which formic acid is fed via line 14 and a buffered solution is utilized as the absorbent, the pH rise is such that the spent absorbent recovered from the absorber is at a pH of 4.0 while that of the regenerated absorbent returned by line 3 is 4.6.

The process as described is highly efficient when preferred conditions are utilized throughout. For a stack gas containing 2000 ppmv $SO_2$, the desulfurized product gas discharged via line 4 typically contains less than 200 ppmv of $SO_2$. The desulfurized product gas typically will carry, on a mass per hour basis, less than 10% of the amount of $SO_x$ carried in the stack gas.

One of the remarkable features of the invention is that the process may easily be operated so as to require little or no discharge of a bleed stream of waste absorbent as is so common in many current processes. In the main, this result is due to the relatively high conversion (above about 90% overall in the most preferred embodiment) of sulfur-containing anions entering regenerator 13 to sulfur. Especially significant are the high conversions possible of such difficulty reducible anions as sulfate and thiosulfate. Under preferred conditions, it is possible to obtain in excess of 75% complete conversions of each of these two anions to elemental sulfur in regenerator 13. And the conversion of sulfite ion, which is the predominate form the absorbed $SO_2$ takes in the spent absorbent removed from absorber 2, is virtually complete, with 99% or better conversions to sulfur being commonly obtained. Hence, because of the high conversions of dissolved sulfur components to sulfur in regenerator 13 (and also because formic acid rather than a formate salt is preferably added via line 14), the concentration of dissolved ions in the regenerated absorbent is usually easily maintained below the saturation level of any compound, thereby eliminating the need in the preferred embodiment for a bleed discharge via line 24, which in turn eliminates the need for make-up via line 23.

The following Examples illustrate the usefulness of the absorbent utilized in the invention for removing $SO_x$ compounds and of the catalytic nature of Amberlyst A-21 resin for regenerating spent absorbent by conversion of dissolved sulfur constituents to sulfur.

EXAMPLE I

To demonstrate the suitability of removing $SO_x$ compounds from a stack gas with an absorbent comprising sodium formate, the following experiment was performed. A simulated stack gas of composition (dry basis): 14.54 mol% $CO_2$, 3.35 mol% $O_2$, 81.77 mol% $N_2$, 1824 ppmv $SO_2$, and 4 ppmv of other sulfur compounds (calculated as $SO_2$) was directed at a rate of 782.4 cc/min (measured at 60° F.) to an absorber operating at atmospheric pressure and about 80° F. The absorbent being recirculated at a rate of 86.8 ml/hr consisted of about 500 ml of an aqueous solution of 5.07 wt.% sodium formate having a pH initially of 7.7. The product gas removed early in the run was of the following composition (dry basis): 14.47 mol% $CO_2$, 3.38 mol% $O_2$, 82.00 mol% $N_2$, 22 ppmv $SO_2$, and 7 ppmv of other sulfur compounds (calculated as $SO_2$). The product gas, therefore, contained only about 1.21% of the $SO_2$ (on both a volume and a mass basis) as was contained in the stack gas, thereby demonstrating that the absorbent was useful for removing 98.79% of the $SO_2$.

EXAMPLE II

To demonstrate the suitability of regenerating the spent absorbent of Example I, i.e., one containing sodium formate and dissolved $SO_2$, an experiment similar to the one described in Example I was carried out until the spent absorbent being recirculated contained 2.78 wt.% of sulfur components (as sulfur). The spent absorbent was then blended with concentrated formic acid (88% by weight) in a 5:100 volume ratio, formic acid to spent absorbent. The resulting 218 ml solution was then introduced at a rate of 86.7 ml/hr into a regeneration vessel containing 278 cc of Amberlyst A-21 resin which had been pretreated with hot, concentrated formic acid to insure that formate ions occupied the ion exchange sites. Conditions within the regeneration vessel were maintained at 22 psig and 260° F. The products obtained from the regenerator vessel were passed to a sulfur separator maintained at the same pressure and temperature conditions as the regeneration vessel. Gases removed from the sulfur separator were passed to a knockout pot to recover a 57 ml condensate having a ph of 3.2 and a total dissolved sulfur compounds concentration (as sulfur) of 52 ppmv. Also obtained from the sulfur separator was 161 ml of regenerated absorbent, which was collected in an absorbent product receiver. The regenerated absorbent had a pH of 3.9 and a sulfate ion concentration (as sulfate) of 12 ppmv. Non-condensable gases removed from the knockout pot and the absorbent product receiver were combined with a nitrogen purge such that a vent gas was discharged to the atmosphere at a rate of 141 cc/min (at 60° F.) having the following composition (dry basis): 87.73 mol% $N_2$, 10.48 mol% $CO_2$, 0.98 mol% $H_2$, 7817 ppmv $H_2S$, 6 ppmv $SO_2$, 76 ppmv of other sulfur compounds (as $SO_2$).

Unfortunately, no liquid sulfur was obtained from the sulfur separator in the experiment. Instead, due to the laboratory equipment used, elemental sulfur was found after the experiment to have been entrapped in the regeneration vessel. However, based on the fact that 2.41 gm/hr of total sulfur compounds (as sulfur) entered the regeneration vessel while only about 0.1 gm/hr were discharged, mostly as $H_2S$ in the purge gas, the overall conversion to elemental sulfur in the regeneration vessel was in excess of 95% complete.

Several alternative embodiments of the invention are known. In one, the added formate ion required in regenerator 13 is cheaply produced from a slipstream of the regenerated absorbent produced in sulfur separator 16. With valves 27 and 28 open and 37 closed, regenerated absorbent is directed by lines 29 and 31 and pump 32 through line 33 into reaction vessel 34. In this embodiment of the invention, the process is preferably carried out so that the pH of the regenerated absorbent in line 29 is alkaline, but if not, sufficient of an alkaline agent, such as ammonium hydroxide is added via line 30 to raise the pH of that portion of the regenerated absorbent removed by line 29 to render it alkaline, with a pH of about 8.0–10.0 being most preferred. In reaction vessel 34, conditions are maintained in the presence of carbon monoxide added by line 35 such that a solution containing formate ion is produced in line 36 for recycle to regenerator 13 through valve 28 and line 12. Such conditions typically would include a temperature of about 450° F. and a pressure of about 750 psig; however, other conventionally well known conditions for producing a solution of a formate salt from carbon monoxide in the presence of an alkaline medium may also be used. Preferably, the formate salt solution in line 36 is obtained at a rate sufficient to provide all the necessary formate ion for regeneration of the spent absorbent in regenerator 13.

The foregoing embodiment of the invention is preferably made consonant with the object of discharging no bleed stream via line 24. This is accomplished by operating regenerator 13 so that the acidic spent absorbent in line 5 is regenerated to produce a solution in line 15 having an alkaline pH, and preferably having an alkaline pH between about 8 and 10. Since no alkaline agent need be added via line 30 when the pH of the liquid in line 29 is above 7.0, no discharge via line 24 is required to compensate for added alkaline agent.

Operating the process so as to obtain an alkaline regenerated absorbent substantially changes the composition of the gas stream discharged via line 19, primarily with respect to the concentration of $CO_2$. $CO_2$ is readily soluble in alkaline media, and thus, most if not all of the $CO_2$ produced in regenerator 13 will dissolve in the alkaline, regenerated absorbent produced in sulfur separator 16. Ultimately, however, because the pH of the spent absorbent in line 5 is preferably acidic, the $CO_2$ will be released in absorber 2 and discharged to the atmosphere by line 4.

The major reason for producing formate ion in reaction vessel 34 is that it is much cheaper and more environmentally sound than purchasing, for example, 88 wt.% or 100 wt.% formic acid as a feed for line 14. As a source of formate ion, the solution in line 36 is more cheaply produced than commercially prepared formic acid because sodium hydroxide and sulfuric acid are usually consumed in the commercial preparation of formic acid whereas in the invention only CO is consumed. Moreover, further costs are incurred on a commercial scale because commercial grade formic acid must be purified. Also, since no waste disposal problem inheres in the preferred embodiment of the invention, the production of a solid waste, such as sodium sulfate, which occurs in the commercial preparation of formic acid, is obviated.

$NO_x$ REMOVAL

Because many stack gases and other waste gas streams contain only $NO_x$ compounds as pollutants, or contain $NO_x$ compounds in addition to $SO_x$ compounds, the invention is accordingly also directed to removing $NO_x$ from such gas streams. Although $NO_x$ is present in stack gases largely as NO, up to about 10% of the $NO_x$ can be in the form of $NO_2$. $NO_2$ is readily removed in all embodiments of the invention due to its high solubility in aqueous media. It is believed in the invention that, when the absorbent traversing absorber 2 contains dissolved sulfite ion, at least some $NO_2$ reacts directly in the absorber with sulfite ion to produce elemental nitrogen and sulfate ion. And as with absorbents that do not contain sulfite ion, any unreacted $NO_2$ is dissolved as the nitrate or nitrite ions, which are ultimately converted in regenerator 13 to nitrogen. However, regardless of the chemical mechanism involved, and regardless of the pH of the regenerated absorbent, it is known that in the continuous process of the invention the regenerated absorbent is recovered from the regenerator in a condition capable of removing $NO_2$ from feed gases entering the absorber.

The removal of NO is more difficult than is the removal of $NO_2$, but it has been found that the absorbent, after the addition of iron(II) chelates thereto, becomes useful for absorbing NO which might also be present in the feed gas with the $SO_x$ components. Thus, to remove NO and $SO_x$, the absorbent, in addition to containing a dissolved formate compound, also contains a water-soluble iron(II) chelate, such as Fe(II) EDTA (ferrous ion chelated by ethylenediaminetetraacetic acid) and Fe(II) HEDTA (ferrous ion chelated by N(hydroxyethyl) ethylenediaminetriacetic acid). Such chelates are preferably present in the absorbent in a concentration between about 0.001 and 1.0 molar.

When the absorbent contains iron(II) chelate, it is highly effective for removing NO, most probably by the direct chemical reaction:

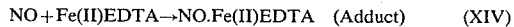

$$NO + Fe(II)EDTA \rightarrow NO.Fe(II)EDTA \quad (Adduct) \qquad (XIV)$$

In addition, however, some of the iron(II) chelate may react with oxygen, if present in the feed gas, to yield an iron(III) chelate, such as Fe(III)EDTA (ferric ion chelated by ethylenediaminetetraacetic acid). But in regenerator 13, under the mild conditions hereinbefore specified, the spent absorbent containing dissolved NO and any iron(III) chelate is regenerated to a form once again containing the active iron(II) chelate, most probably by the following chemical reactions:

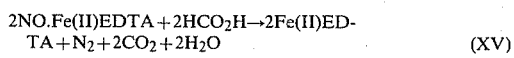

$$2NO.Fe(II)EDTA + 2HCO_2H \rightarrow 2Fe(II)EDTA + N_2 + 2CO_2 + 2H_2O \qquad (XV)$$

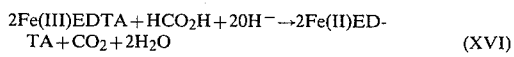

$$2Fe(III)EDTA + HCO_2H + 2OH^- \rightarrow 2Fe(II)EDTA + CO_2 + 2H_2O \qquad (XVI)$$

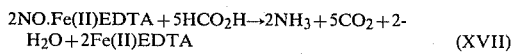

$$2NO.Fe(II)EDTA + 5HCO_2H \rightarrow 2NH_3 + 5CO_2 + 2H_2O + 2Fe(II)EDTA \qquad (XVII)$$

The innocuous nitrogen and trace ammonia produced in regenerator 13 from the dissolved NO are removed as components of the gas stream discharged through vent 19.

Thus, in this embodiment of the invention, a single absorbent is utilized to remove both $SO_x$ and NO components, and the spent absorbent is regenerated by contact in the presence of added formate ion with a tertiary amine-containing substance as described hereinbefore. One of the specific features of the invention, therefore, when both $SO_x$ and NO components must be removed is that an aqueous absorbent comprising a formate compound and an iron(II) chelate is useful for removing both $SO_x$ and NO in the same absorber and, when spent, is capable of being regenerated for the simultaneous removal of $SO_x$ and NO in a single regeneration step.

As stated above, any iron(III) chelate formed in the absorber by reaction with oxygen must on a continuing basis be reconverted to sufficient iron(II) chelate in regenerator 13 so as to insure the continuous removal of NO from the feed gas. Iron(III) chelate is not active for removing NO, and accordingly, when NO is to be removed, iron(III) chelate must be reduced to iron(II) chelate in regenerator 13. A highly convenient visual method for determining if the regenerated absorbent is sufficiently regenerated for purposes of NO absorption is by the color of the regenerated absorbent. Since iron(II) chelates are colorless, while most iron(III) chelates exhibit noticeable color (e.g., iron(III)HEDTA yields a greenish color at a pH less than about 4.5 and a brownish-red color at a pH greater than 4.5), the regenerated absorbent in line 18 must either be colorless or exhibit a lighter color than the spent absorbent in line 5. Most usually, however, if iron(III) chelate is formed in the absorber, the regenerated absorbent will evince some color, and hence a convenient operating method involves maintaining the total concentration of iron chelates such that, if oxygen does react with some iron(II) chelates, then the spent absorbent will be of a relatively dark color while the regenerated absorbent will exhibit a tinge of color, thereby indicating the presence of only insignificant concentrations of iron(III) chelate in the regenerated absorbent.

In view of the foregoing, it should be apparent that the invention may easily be modified so as to be useful for removing NO from a feed gas containing NO but no $SO_x$ compounds, e.g., a stack gas produced from burning sulfur-free natural gas as fuel. In this modification, it is only necessary to close valve 38 (because no elemental sulfur will be produced) and provide a regenerated absorbent in line 3 containing sufficient of an iron(II) chelate to remove the NO in the feed gas. Spent absorbent is then regenerated in regenerator 13 with sufficient added formate ion from a source such as formic acid added through line 14. Regeneration in regenerator 13 is accomplished, for example, by contact with Amberlyst A-21 resin in a manner as hereinbefore described for removing $SO_x$ plus $NO_x$ compounds. The conversion of dissolved NO to nitrogen and trace ammonia in regenerator 13 is such that as much nitrogen components (as nitrogen) are discharged via line 19 as are absorbed in the absorbent in absorber 2.

Although the invention has been described in conjunction with specific embodiments and examples thereof, it is evident that many alternatives, modifications, and variations will be apparent to those skilled in the art in light of the foregoing description. For example, rather than passing only a portion of the regenerated absorbent recovered in sulfur separator 16 into reaction vessel 34, it is also within the scope of the invention to pass all the regenerated absorbent so recovered to reaction vessel 34. In such embodiment, the formate ion-containing solution produced in line 36 is routed (by means not shown in the drawing) to absorber 2 rather than to regenerator 13. Thus, the added formate ion needed for regeneration is introduced first into absorber 2 and thence carried to regenerator 13. Accordingly, it is intended to embrace this and all such alternatives, modifications, and variations that fall within the spirit and scope of the appended claims.

I claim:

1. A process for removing $SO_x$ compounds from a feed gas stream and producing a product gas stream of reduced $SO_x$ content, which process comprises:
   (1) contacting a feed gas stream containing one or more sulfur compounds selected from the group consisting of $SO_x$ and $SO_3$ with an absorbent comprising an aqueous buffered solution of formic acid and a formate salt under conditions sufficient to absorb said sulfur compounds into said absorbent;
   (2) maintaining the absorption capacity of said absorbent for removing said sulfur compounds by adding fresh absorbent to, and removing spent absorbent from, said absorbent being contacted with said feed gas stream, said fresh absorbent consisting essentially of an aqueous solution containing between about 5 and 30 weight percent of a formate salt and sufficient formic acid to buffer the fresh absorbent to a pH between about 2.5 and 5.0; and
   (3) withdrawing from step (1) a product gas stream of reduced $SO_x$ content.

2. A process as defined in claim 1 wherein said fresh absorbent is a buffered solution of sodium formate and formic acid.

3. A process for removing $SO_x$ compounds from a feed gas stream and producing a product gas stream of reduced $SO_x$ content, which process comprises:
   (1) contacting a feed gas stream containing one or more sulfur compounds selected from the group consisting of $SO_2$ and $SO_3$ with an absorbent comprising an aqueous solution containing a water-soluble formate compound, thereby absorbing at least some of said sulfur compounds into said absorbent and producing a product gas stream of reduced $SO_x$ content;
   (2) withdrawing from step (1) a liquid stream of spent absorbent containing said absorbed sulfur compounds;
   (3) regenerating said spent absorbent back to a form active for absorbing $SO_x$ compounds by contacting, in the presence of added formate ion, said spent absorbent with a water-insoluble, solid substance containing a tertiary amine functional group;
   (4) separating, from a mixture withdrawn from step (3), elemental sulfur and regenerated absorbent;
   (5) recycling the separated, regenerated absorbent obtained in step (4) to step (1); and
   (6) recovering a product gas stream of reduced $SO_x$ content from step (1) and a stream of elemental sulfur from step (4).

4. A process as defined in claim 3 wherein said substance in step (3) comprises an anionic, ion exchange resin containing basic tertiary amine functional groups and containing formate ions in at least some of the ion exchange sites.

5. A process as defined in claim 4 wherein said absorbent in said step (1) comprises a buffered solution of sodium formate and formic acid.

6. A process as defined in claim 4 wherein said absorbent also comprises an alkaline agent selected from the class consisting of water-soluble metal hydroxides, ammonium hydroxides, and water-soluble salts of a strong base and a weak acid.

7. A process as defined in claim 4 wherein the amount of $SO_x$ carried with the product gas stream, on a mass per hour basis, is less than 10% of the amount of $SO_x$ carried with the feed gas.

8. A process as defined in claim 4 wherein the temperature and pressure during the contacting of step (3) are respectively maintained at between about 150° and 350° F. and 4 and 135 psia.

9. A process as defined in claim 4 wherein said resin is an organic resin comprising a copolymer of styrene and divinylbenzene and containing weakly basic tertiary amine functional groups and containing formate ion at the ion exchange sites.

10. A process as defined in claim 4 wherein the pH of the liquid stream of spent absorbent in step (2) is in the 3.0–4.5 range and the pH of the regenerated absorbent being recycled in step (5) is in the 4.5–5.0 range.

11. A process as defined in claim 4 wherein the pH of the regenerated absorbent being recycled in step (5) is in the range of 2.5–10.0.

12. A process as defined in claim 4 wherein the source of said added formate ion in step (3) is formic acid.

13. A process for removing $SO_x$ compounds from a feed gas stream and producing a desulfurized product gas stream therefrom, which process comprises:
   (1) contacting a feed gas stream containing one or more sulfur compounds selected from the group consisting of $SO_2$ and $SO_3$ with an absorbent comprising an aqueous solution containing sodium formate so as to absorb said sulfur compounds into said absorbent and produce a desulfurized product gas stream;
   (2) withdrawing from step (1) a liquid stream of spent absorbent containing said absorbed sulfur compounds;
   (3) regenerating said spent absorbent back to a form active for absorbing $SO_x$ by contacting, in the presence of added formate ion, and at a temperature above about 240° F., said spent absorbent with an organic, anionic ion exchange resin comprising a copolymer of styrene and divinylbenzene and containing weakly basic tertiary amine functional groups, said resin containing formate ion in at least some of the ion exchange sites;
   (4) withdrawing from step (3) a mixture comprising elemental sulfur and regenerated absorbent having an alkaline pH, and separating said mixture into separate streams of elemental sulfur and said regenerated absorbent;
   (5) subjecting a portion of said regenerated absorbent to conditions of elevated temperature and pressure in the presence of carbon monoxide so as to produce a solution containing a dissolved formate compound;
   (6) recycling said solution containing a dissolved formate compound obtained in step (5) to step (3), said solution providing at least a portion of the added formate ion required to regenerate the spent absorbent in step (3);
   (7) recycling the remaining portion of said regenerated absorbent obtained in step (4) to step (1); and
   (8) recovering a desulfurized product gas stream from step (1) and a stream of elemental sulfur from step (4).

14. A process as defined in claim 13 wherein the amount of $SO_x$ carried with the desulfurized product gas stream, on a mass per hour basis, is less than 10% of the amount of $SO_x$ carried with the feed gas.

15. A process as defined in claim 13 wherein the temperature and pressure in step (3) are maintained at about 260° F. and about 21 psig.

16. A process as defined in claim 13 wherein said feed gas stream contains $NO_2$, and said $NO_2$ is absorbed in the absorbent in step (1), which absorbent is then regenerated in step (3) to a form active for absorbing $NO_2$.

17. A process for removing $SO_x$ and NO compounds from a feed gas stream and producing a product gas stream essentially free of $SO_x$ and NO, which process comprises:
   (1) contacting a feed gas stream containing NO and a sulfur compound selected from the group consisting of $SO_2$ and $SO_3$ with an absorbent comprising an aqueous solution containing a dissolved formate-containing compound and a dissolved iron(II) chelate so as to absorb said sulfur compounds and said NO into said absorbent and produce a product gas stream essentially free of NO and $SO_x$ compounds;
   (2) withdrawing from step (1) a liquid stream of spent absorbent containing said absorbed sulfur and NO compounds;
   (3) regenerating said spent absorbent back to a form active for absorbing $SO_x$ and NO compounds by contacting, in the presence of added formate ion, said spent absorbent with a water-insoluble, anionic ion exchange resin containing basic tertiary amine functional groups and containing formate ion in at least some of the ion exchange sites;
   (4) separating from a mixture withdrawn from step (3) elemental sulfur, regenerated absorbent, and a gas stream containing elemental nitrogen;
   (5) recycling the separated, regenerated absorbent obtained in step (4) to step (1); and
   (6) recovering a stream of elemental sulfur from step (4), a product gas stream from step (1) essentially free of NO and $SO_x$ compounds, and a gas stream containing nitrogen from step (4).

18. A process as defined in claim 17 wherein said iron(II) chelate is selected from the group consisting of iron(II) EDTA and iron(II) HEDTA.

19. A process for removing NO from a feed gas and producing a product gas stream of reduced NO content, which process comprises:
   (1) contacting a feed gas stream containing NO with an absorbent comprising an aqueous solution containing a water-soluble iron(II) chelate so as to absorb said NO into said absorbent and produce a product gas stream of reduced NO content;
   (2) withdrawing from step (1) a liquid stream of spent absorbent containing said absorbed NO;
   (3) regenerating said spent absorbent back to a form active for absorbing NO by contacting, in the presence of an added water-soluble formate compound, said spent absorbent with a water-insoluble, solid substance containing a tertiary amine functional group;
   (4) separating from a mixture withdrawn from step (3) regenerated absorbent and a gas stream comprising elemental nitrogen;
   (5) recycling the regenerated absorbent obtained in step (4) to step (1); and
   (6) recovering a gas stream comprising elemental nitrogen from step (4) and a product gas stream from step (1) of reduced NO content.

20. A process as defined in claim 19 wherein said solid substance in step (3) comprises an organic anionic ion exchange resin containing basic tertiary amine functional groups and formate ions at the ion exchange sites.

21. A process as defined in claim 19 wherein said iron(II) chelate is selected from the group consisting of iron(II) EDTA and iron(II) HEDTA.

22. A process as defined in claim 19 wherein said product gas stream is essentially free of NO.

23. A process as defined in claim 19 wherein said feed gas stream also contains oxygen.

24. A process for removing NO from a feed gas and producing a product gas stream of reduced NO content, which comprises:
  (1) contacting a feed gas stream containing NO with an absorbent comprising an aqueous solution containing a water-soluble iron(II) chelate so as to absorb said NO into said absorbent and produce a product gas stream of reduced NO content;
  (2) withdrawing from step (1) a liquid stream of spent absorbent containing said absorbed NO;
  (3) regenerating said spent absorbent back to a form active for absorbing NO by contacting, in the presence of an added, dissolved formate compound, said spent absorbent with a water-insoluble, solid substance containing a tertiary amine functional group, said functional group having anionic exchange capacity, with formate ion occupying the ion exchange site;
  (4) separating from a mixture withdrawn from step (3) regenerated absorbent having a pH in the 2.5–10.0 range and a gas stream comprising elemental nitrogen;
  (5) recycling a portion of the regenerated absorbent obtained in step (4) to step (1);
  (6) subjecting the remaining portion of regenerated absorbent to conditions of elevated temperature and pressure sufficient to produce in the presence of carbon monoxide a solution containing formate ion;
  (7) recycling said solution containing formate ion obtained in step (6) to step (3), said solution providing at least a portion of the added formate ion required to regenerate the spent absorbent in step (3); and
  (8) recovering a product gas stream of reduced NO content from step (1) and a gas stream containing nitrogen from step (4).

25. A process for treating a feed aqueous solution containing one or more sulfur-containing anions also containing oxygen, which process comprises (1) contacting, in the presence of formate ion, said feed aqueous solution with a water-insoluble, solid substance containing a tertiary amine functional group under conditions sufficient to produce elemental sulfur and (2) separating said elemental sulfur from a product aqueous solution of reduced sulfur-containing anions content.

26. A process as defined in claim 25 wherein said feed aqueous solution contains a sulfur-containing anion selected from the group consisting of sulfate, sulfite, and thiosulfate ions.

27. A process for simultaneously removing $SO_x$ and NO compounds from a feed gas stream and producing a product gas stream of reduced $SO_x$ and NO content, which process comprises:
  (1) contacting a feed gas stream containing NO and one or more sulfur compounds selected from the group consisting of $SO_2$ and $SO_3$ with an absorbent comprising an aqueous, buffered solution of formic acid and a formate salt, said solution further containing an iron(II) chelate, under conditions sufficient to absorb said sulfur compounds and said NO into said absorbent; and
  (2) withdrawing from step (1) a product gas stream of reduced $SO_x$ and NO content.

28. A process as defined in claim 27 wherein said solution comprises between about 5 and 30 weight percent of the formate salt and said iron(II) chelate is selected from the group consisting of iron(II) EDTA and iron(II) HEDTA, said solution further containing sufficient formic acid to buffer said solution to a pH in the 2.5–5.0 range.

29. A process as defined in claim 28 wherein said solution comprises iron(II) HEDTA in a concentration between about 0.001 and 1.0 molar.

30. A process as defined in claim 29 wherein said formate salt is sodium formate.

31. A liquid absorbent composition useful for removing $SO_x$ and NO from gas streams, which absorbent composition comprises an aqueous solution containing an iron(II) chelate, a formate salt and formic acid.

32. A liquid absorbent as defined in claim 31 wherein said aqueous solution contains sufficient formic acid to buffer the solution to a pH between about 2.5 and 5.0.

33. A liquid absorbent as defined in claim 32 wherein said iron chelate is selected from the group consisting of iron(II) EDTA and iron(II) HEDTA and said formate salt is selected from the group consisting of sodium formate, potassium formate, lithium formate, and ammonium formate.

34. A liquid absorbent as defined in claim 33 wherein said aqueous solution contains sodium formate in a concentration between about 5 and 30 weight percent and further contains iron(II) HEDTA in a concentration between about 0.001 and 1.0 molar.

* * * * *

UNITED STATES PATENT AND TRADEMARK OFFICE
CERTIFICATE OF CORRECTION

PATENT NO. : 4,222,991
DATED : September 16, 1980
INVENTOR(S) : Robert H. Hass

It is certified that error appears in the above-identified patent and that said Letters Patent are hereby corrected as shown below:

Column 12, line 6, change "$SO_x$" to -- $SO_2$ --.

Signed and Sealed this

Ninth Day of December 1980

[SEAL]

Attest:

SIDNEY A. DIAMOND

Attesting Officer

Commissioner of Patents and Trademarks